March 2, 1965   W. L. KIBLER   3,171,155
WINDSHIELD CLEANING SYSTEM
Filed July 11, 1963   3 Sheets-Sheet 1
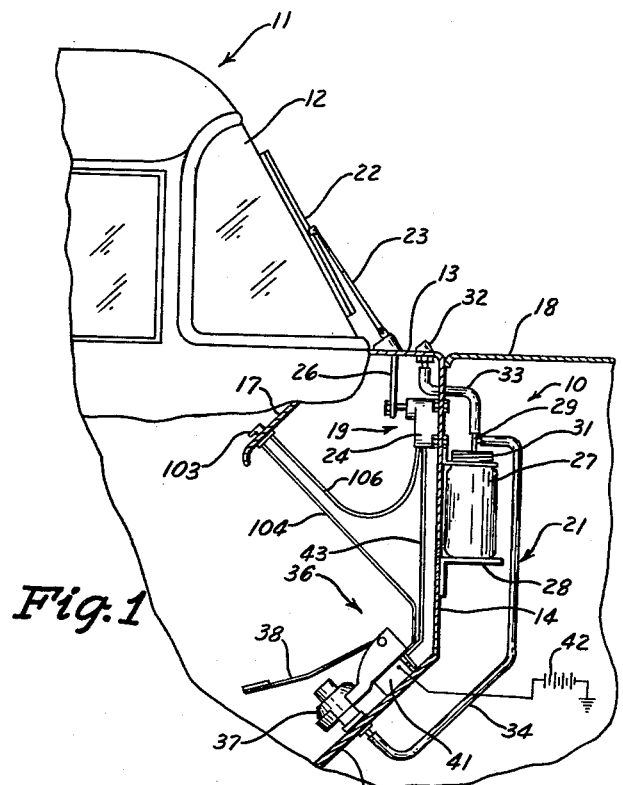
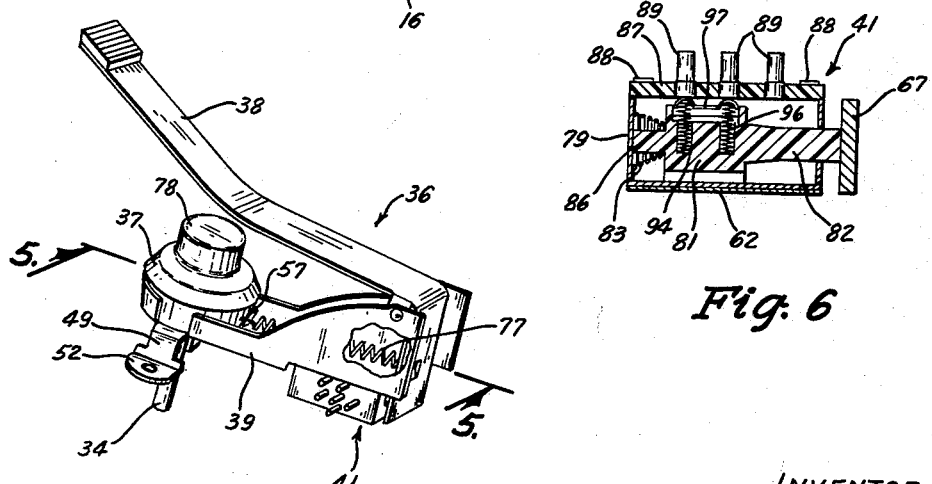
INVENTOR
WILLIS L. KIBLER
BY
ATTORNEY March 2, 1965     W. L. KIBLER     3,171,155
WINDSHIELD CLEANING SYSTEM
Filed July 11, 1963     3 Sheets-Sheet 2

INVENTOR
WILLIS L. KIBLER
BY
ATTORNEY

INVENTOR
WILLIS L. KIBLER

United States Patent Office 3,171,155
Patented Mar. 2, 1965

3,171,155
WINDSHIELD CLEANING SYSTEM
Willis L. Kibler, Detroit, Mich., assignor to The Delman Company, Cookeville, Tenn., a corporation of Tennessee
Filed July 11, 1963, Ser. No. 294,423
1 Claim. (Cl. 15—250.02)

This invention relates to a windshield cleaning system of a type having an electrically operated wiper unit and a manually operated washer unit operable in response to actuation of a common control device.

It is the object of the invention to provide an improved control device having a foot lever for the wiper unit and washer unit of a windshield cleaning system which is operable on movement of the foot lever to actuate the wiper unit prior to the actuation of the washer unit.

Another object of the invention is to provide a control device having a foot lever which is movable to successively operate an electric switch and depress a pump bellows.

A further object of the invention is to provide in a windshield cleaning system having a wiper unit and a washer unit, a common control device for the units having a one piece frame retaining a pump bellows of the washer unit and a switch of the wiper unit, a lever pivotally mounted on the frame and selectively engageable with the switch and pump bellows and a tension spring connected to the lever and frame operable to bias the lever out of engagement with the pump bellows and to hold the switch in an open position.

An additional object of the invention is to provide a control device for selectively and conjointly operating the electric wiper unit and washer unit in a windshield cleaning system which has a minimum number of parts and is economical in cost and installation, and capable of operating both units in combination by means of a foot movement.

These and other objects will be apparent from reference to the following description and the accompanying drawing, wherein:

FIG. 1 is a fragmentary foreshortened longitudinal sectional view of a vehicle having a windshield showing assembled therewith the windshield cleaning system of this invention;

FIG. 2 is an enlarged perspective view of the foot operated pump and switch unit shown in FIG. 1;

FIG. 6 is a sectional view taken along the line 6—6 of FIG. 5; and

Figure 3:
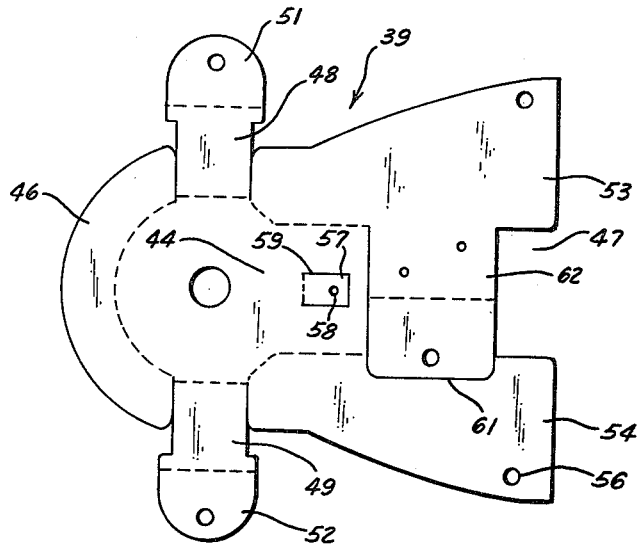
FIG. 3 is a plan view of the blank layout of the one piece frame of the unit shown in FIG. 1.

Referring to the drawing, there is shown in FIG. 1 a windshield cleaning system indicated generally by the numeral 10 in assembled relation with a motor vehicle 11 equipped with a windshield 12, and an engine cowl 13 extended forwardly from the lower front edge of the windshield 12. The cowl 13 is integrally joined with an upright fire wall 14 which terminates in a downwardly inclined toe board 16. The vehicle has a conventional dash or instrument panel 17 positioned below and extended rearwardly from the windshield 12. A hood 18 extends forwardly from the cowl 13 and covers the engine compartment.

The windshield cleaning system 10 has a wiper unit and a washer unit designated generally as 19 and 21, respectively. The wiper unit 19 is operable independently of the washer unit 21. The washer unit 21 is operable conjointly with the wiper unit 19 to dispense cleaning fluid onto the windshield 12 after actuation of the wiper unit 19.

The wiper unit 19 includes a pair of wiper elements 22, one of which is shown, engageable with the outside surface of the windshield 12. A spring biased arm 23 mounts the wiper element 22 on the cowl 13 for oscillatory movement over the windshield. An electric motor 24 secured to the fire wall 14 is connected to the arm 23 by means of motion transmitting linkage 26. When the electric motor 24 is energized it drives the motion transmitting linkage 24 to oscillate the wiper element 22 over the windshield 12.

The washer unit 21 includes a cleaning fluid container or reservoir 27 which is mounted on the fire wall 14 by a bracket 28. The windshield cleaning fluid stored in the reservoir 27 is in fluid communication with a check valve 29 mounted on the cap 31 of the reservoir. A nozzle 32 mounted on the cowl 13 forward of the windshield is connected in fluid communication with the check valve 29 by a hose 33. A fluid transmitting hose 34 connects the valve 29 with a control unit or pump and switch assembly 36 which includes a hollow bellows 37 in fluid communication with the hose 34. The bellows 37 is depressed by a lever 38 to discharge cleaning fluid under pressure into the hose 34. The check valve 29 in response to a pressure of cleaning fluid in the hose 34 prevents the cleaning fluid from flowing back into the reservoir 29 and permits the cleaning fluid under pressure to flow into the hose 33 through the discharge openings in the nozzle 32 onto the windshield 12.

As shown in FIG. 2, the pump and switch assembly 36 comprises a frame 39 supporting the bellows 37 and an electric switch 41. The switch 41 is operative to connect and disconnect a source of electric energy 42, such as a battery, to the electric motor 24 which is connected to the switch by a line 43. The electric switch 41 and the bellows 37 are actuated in sequence by the manual movement of the lever 38. This action will be subsequently described in detail.

The blank layout of the frame 39 is shown in FIG. 3. The frame 39 is a one-piece member formed from substantially flat sheet metal and has a longitudinal base section 44 terminating in a rounded end 46 and a recessed end 47. Projecting laterally in opposite directions from the base section 44 adjacent the rounded end are a pair of leg members 48 and 49 each having enlarged toe sections 51 and 52, respectively. A pair of rectangular shaped arm members 53 and 54 extend laterally in opposite directions from the base section 44 adjacent the recessed end 47. Each arm member has a transverse hole 56 in the outer section.

The base section has a longitudinally extended tab 57 having a hole 58 which is defined by a U-shaped slot 59. A transversely extended U-shaped slot 61 is cut out of the base section 44 and arm member 54 and forms a third leg member 62 which is coextensive with the arm member 53.

Figure 4:
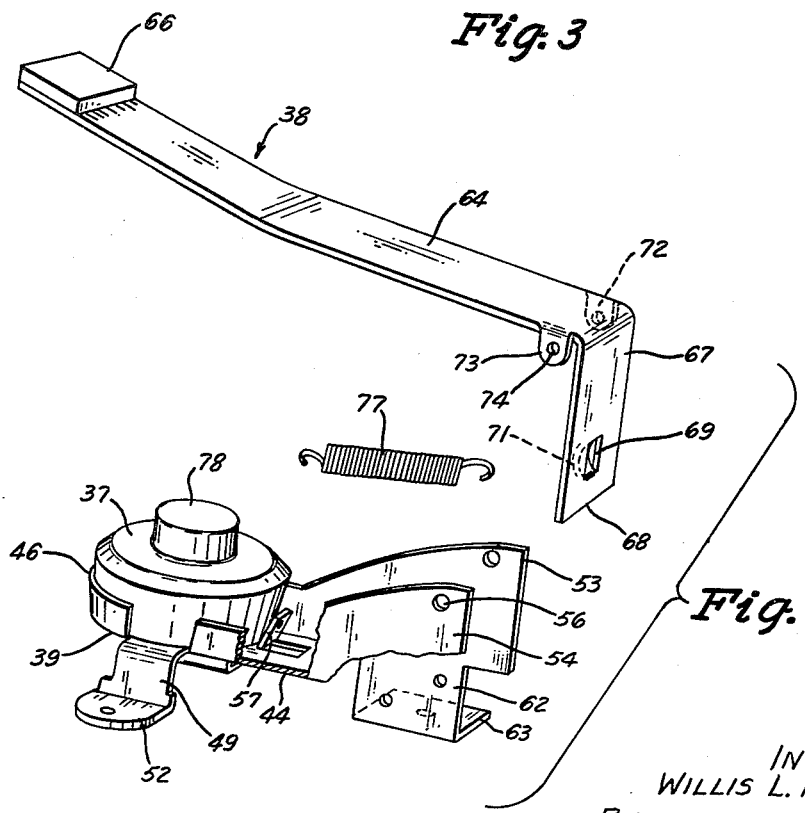
FIG. 4 is an exploded perspective view of the foot operated pump and switch unit.

The housing blank is formed into its utilitarian shape by a pressing operation during which the housing is bent substantially 90° along the broken lines shown in FIG. 3 into the shape of the housing 39 shown in FIG. 4. The leg members 48 and 49 are bent in a downward and outward direction and the sides of the base section are bent in an upward direction forming a cup-shaped housing for the bellows 37. The arm members 53 and 54 are parallel and extend in an upward direction with the third leg 62 extending in a downward direction and terminating in a lateral outwardly directed flange 63. The tab 57 extends in an upward direction between the arm members 53 and 54.

The lever 38 is an L-shape with the long arm 64 having an upwardly bent terminal portion retaining a resilient foot pad 66. Extended downwardly from the long arm 64 is a short arm 67 which has an outwardly bent terminal section 68. A pair of parallel slits 69 define a bridge section 71 which is curved to form an eyelet. The section of the long arm adjacent the short arm 67 has a pair of downwardly extended ears 72 and 73 having an axially aligned hole 74.

Figure 5:
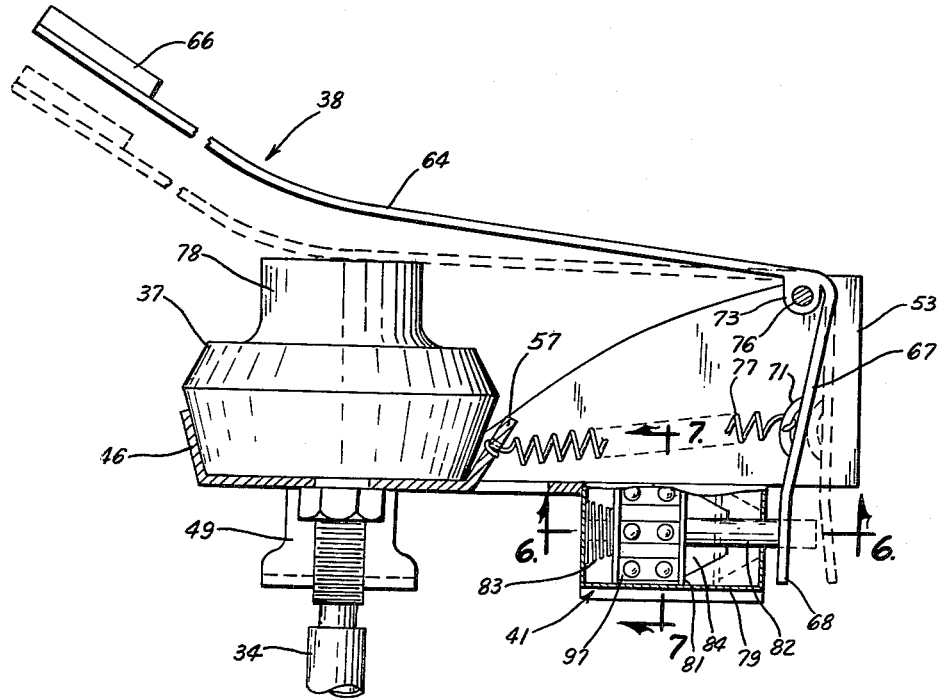
FIG. 5 is an enlarged sectional view taken along the line 5—5 of FIG. 2.

As shown in FIG. 5, the lever 38 is interposed between the arm members 53 and 54 of the frame 39 with the ears 72 and 73 adjacent the inside surfaces of the arm members so that the holes 56 and 74 are in axial alignment. A pin 76 extends through the respective holes to pivotally mount the lever 38 on the frame 39. A tension spring 77 connected at one end to the tab 57 and at the other end to the bridge section 71 of the lever short arm 67 biases the long arm 64 of the lever out of engagement with the head knob 78 of the bellows 37.

As shown in FIG. 5, the switch 41 has a box-shaped casing 79 the base of which is secured to the third leg 62 by screws (not shown). A longitudinally movable contact carrier 81 of an electrical insulating material is slidably disposed in the casing 79 and has a longitudinally extended control rod 82 extended through the casing 79. A compression spring 83 is interposed between the casing 79 and the contact carrier 81 and biases the carrier and the control rod 82 toward the short lever arm 67. A pair of stop members 84 integrally formed with the control rod 82 are engageable with the casing 79 to limit the longitudinal movement of the contact carrier 81.

As shown in FIG. 6, a longitudinal projection 86 extending in a direction opposite to that of the control rod 82 and positioned within the confines of the compression spring 83 is engageable with the casing side wall 79. The projection 86 thus functions to limit the movement of the contact carrier 81 in one direction and to limit the compression of the spring 83 against the casing side wall 79.

A cover member 87 of electrical insulating material closes the casing 79 and is retained thereon by ears 88 which are integrally formed with the top of the casing 79 and are bent over the edges of the cover member 87.

Figure 7:
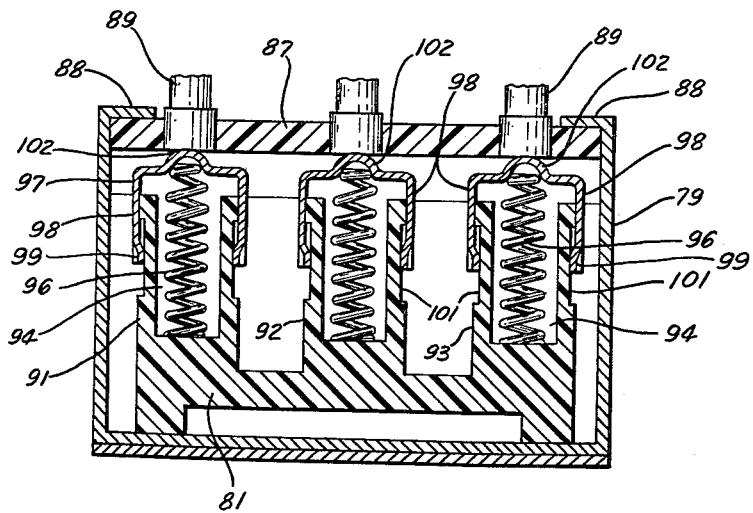
FIG. 7 is an enlarged sectional view taken along the line 7—7 of FIG. 5.

As shown in FIGS. 6 and 7, the cover member 87 carries longitudinally spaced electric contacts 89 which are electrically coupled to the battery 42 and the electric motor 24. The electrical coupling of the switch 41 with the battery 42 and the electric motor 24 is described in detail in U.S. Patent No. 2,970,335, issued February 7, 1961, to Edmond F. Webb.

The contact carrier 81 has a trio of transversely spaced, longitudinally elongated support members 91, 92 and 93. Each support member has a pair of longitudinally spaced wells 94 for retaining a compression spring 96 which extends above the height of the sides of the casing 79.

An electrically conductive metallic contact cap 97 of inverted U-shape is positioned over each support member 91–93 whereby the sides 98 of the cap depend adjacent the respective sides of the support member to prevent lateral movement of the cap. The cap 97 is retained on the support member by tongue portions 99 formed on the terminal edges of the sides of the cap and extend into complementary grooves 101 in the adjacent sides of the support member. The top of each cap 97 has a pair of dimpled sections 102 which are longitudinally spaced so that each dimple is in vertical alignment with a corresponding spring 96. The cap member 97 is biased by the springs 96 into engagement with the electrical contacts 89 carried by the cover member 87.

As shown in FIG. 5 the contact carrier 81 is moved from an "off" position as shown by the full line to an "on" position as shown by the broken lines wherein the battery 42 is connected to the electric motor 24 thereby operating the wiper unit 19. These positions of the contact carrier 81 are determined by the angular position of the lever short arm 67. When the lever 38 is depressed the arm 67 is moved away from the control rod 82 so that the compression spring 83 will move the contact carrier until the stop member 84 engages the casing 79. In this position the lever 38 is in the broken line location as shown in FIG. 5. When the force on the lever 38 has been removed the tension spring 77 biases the lever arm 67 back to its initial full line position carrying the contact member longitudinally into the casing 79 and compressing the spring 83. The tension spring 77 has sufficient force to retain the contact carrier 81 in the "off" position.

A separate electrical switch 103 mounted on the dash panel 17 is connected to the battery by line 104 and to the electric motor by a line 106. The switch 103 is a two position switch which is operative to connect the electric motor 24 with the battery 42.

In use, the wiper unit 19 may be operated independently of the washer unit 21 by the actuation of the manual switch 103 to connect the electric motor 24 to the battery 42. Alternatively, the battery 42 may be connected to the electric motor by depressing the foot lever 38 to the broken line position shown in FIG. 5. In this position the contact carrier 81 is biased by the spring 83 to the "on" position thereby connecting the electrical contact 89 with the cap 97 to provide an electrical coupling between the battery 42 and the electric motor 24. Upon removal of the force from the lever 38 the tension spring 77 will bias the lever in an upward direction rotating the short lever arm 67 about the pin 76 with the resultant movement of the contact carrier 81 and the control rod 82 into the casing 79 compressing the compression spring 83. The contact carrier being in the "off" position terminates the electrical coupling between the battery 42 and the electric motor 24.

In the conjoint operation of the wiper unit 19 with the washer unit 21, the operator of the vehicle depresses the lever 38 with his foot moving it to the broken line position as shown in FIG. 5. In this position the switch 41 is operative to connect the battery 42 with the electric motor 24 thereby operating the wiper unit 19 prior to the operation of the washer unit. With the continued depression of the lever 38 the long arm 64 thereof contacts the head knob 78 of the bellows 37 forcing the bellows to a collapsed position. The windshield cleaning fluid in the bellows 37 is forced under pressure through the hose 34, check valve 29, and the hose 33 to the nozzles 32 which direct the cleaning fluid onto the windshield 12 in the path of the oscillating wiper elements 22.

With the removal of the force from the lever 38 the bulb 37 will return to its initial expanded position and will be recharged with cleaning fluid by operation of the check valve 29. The lever 38 may be subsequently depressed to dispense a second quantity of cleaning fluid onto the windshield 12. In this event the wiper element will continue to oscillate as long as the switch 41 remains in the "on" position. When all of the depressing force on the lever 38 has been removed the tension spring 77 biases the lever 38 back to its normal position as shown in full line in FIG. 5 carrying the carrier element 81 of the switch 41 to the "off" position.

In summary, the windshield clearing system 10 has a wiper unit 19 and a washer unit 21 which has a common control device 36 provided with a pump bellows 37 forming part of the washer unit and a switch 41 forming a part of the wiper unit. A pivotally mounted lever 38 is selectively engageable with the pump bellows 37 and the switch 41 to selectively and conjointly operate the wiper unit and the washer unit. The lever 38 pivots about the pin 76 to actuate the switch 41 prior to the actuation of the pump bellows 37 resulting in the operation of the wiper unit 19 prior to the operation of the washer unit 21.

While there have been shown, described and pointed out the fundamental novel features of the invention as applied to the preferred embodiment, it is to be understood that various omissions, substitutions, changes in form, and details of the apparatus illustrated may be made by those skilled in the art, without departing from the spirit of the invention. It is intended to be limited only by the scope of the following claim.

I claim:

A windshield cleaning system for a vehicle having a windshield and a source of electric energy comprising:
- (a) a wiper unit including at least one wiper element engageable with the windshield and an electric motor operative to oscillate the wiper element over the windshield,
- (b) a washer unit including a pump bellows operative to discharge cleaning fluid under pressure onto the windshield,
- (c) switch means biased to closed condition operative to connect and disconnect the electric motor with the source of electric energy,
- (d) a control device operative to sequentially actuate said switch means and to depress the pump bellows, including
- (e) frame means including a base portion,
- (f) means to mount the pump bellows on and perpendicular to said base portion,
- (g) means to mount the switch means on and parallel to the base portion,
- (h) lever means,
- (i) pivot means to mount the lever on said frame, the pivotal connection formed thereby defining first and second arm portions of the lever, said arm portions being substantially perpendicular to each other, said first arm portion normally engaging said switch means to hold it in open condition, said second arm portion normally aligned above and out of engagement with said pump bellows, said second arm portion engaging said pump bellows only after said first arm portion has disengaged from said switch means, whereby pivotal movement of the lever means about said pivot sequentially energizes said wiper motor prior to the discharge of cleaning fluid onto the windshield and,
- (j) tension spring means connected to said first arm portion of the lever means and frame means operative to bias said first arm portion into engagement with the switch means.

References Cited in the file of this patent
UNITED STATES PATENTS

| 2,970,335 | Webb | Feb. 7, 1961 |
| 2,978,727 | Forster | Apr. 11, 1961 |